United States Patent [19]

Tarbell

[11] Patent Number: 4,491,334
[45] Date of Patent: Jan. 1, 1985

[54] PIANO TRUCK

[76] Inventor: Robert J. Tarbell, 358 Bedford Ave., Buffalo, N.Y. 14216

[21] Appl. No.: 420,004

[22] Filed: Sep. 20, 1982

[51] Int. Cl.³ .............................................. B62B 3/10
[52] U.S. Cl. .............................. 280/47.12; 280/43.17; 280/43.24; 280/79.1 A
[58] Field of Search ............ 280/43.1, 47.13 R, 43.17, 280/43.12, 43.24, 79.1 A, 47.12, 79.1 R; 248/352; 414/778, 781, 754, 678

[56] References Cited

U.S. PATENT DOCUMENTS

| 1,137,993 | 5/1915 | McCarthy | 280/47.12 |
| 1,170,748 | 2/1916 | Guarniery | 280/47.12 |
| 1,285,457 | 12/1983 | Storer | 280/47.12 |
| 2,446,518 | 8/1948 | Arnold | 280/43.24 |
| 3,250,513 | 5/1966 | Fenner | 280/43.17 |
| 3,480,292 | 11/1969 | Börkey | 280/43.17 |

FOREIGN PATENT DOCUMENTS 1466499  12/1966  France ............................. 280/43.24

Primary Examiner—Joseph F. Peters, Jr.
Assistant Examiner—Joseph G. McCarthy
Attorney, Agent, or Firm—Joseph P. Gastel

[57] ABSTRACT

A truck for moving a grand piano including a pair of side frame members for insertion under the piano, a pair of beams for connecting the side frame members to each other after the side frame members have been inserted, straps for attaching the piano to the truck, curved sections on the side frame members for pivoting the truck to a position wherein the side frame members orient the piano on its side while supporting the piano, selectively extensible casters on the side frame members for raising and lowering the truck relative to the floor with the piano mounted thereon, and hinges on the side frame members for folding them inwardly toward the piano when the piano is mounted on its side on the truck.

18 Claims, 28 Drawing Figures

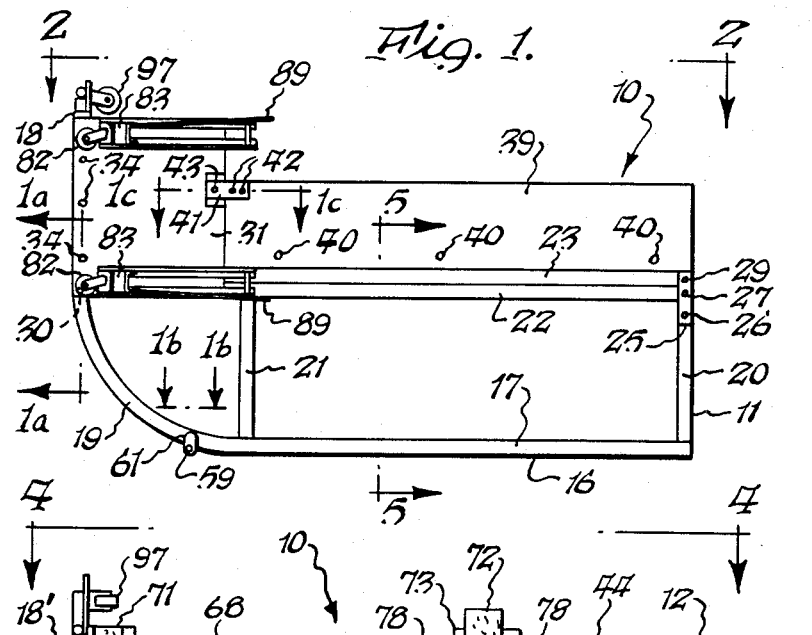
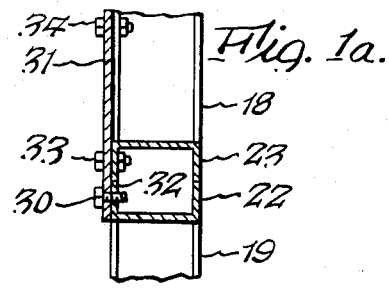
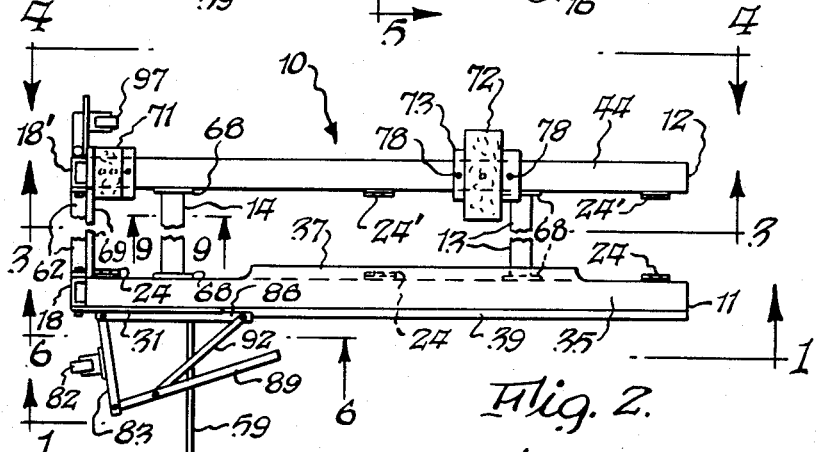
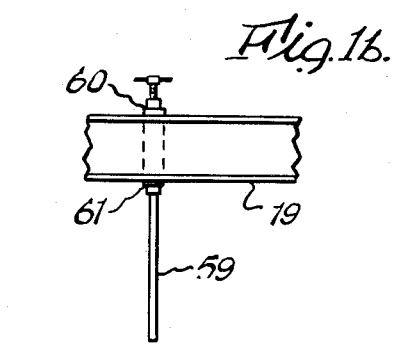
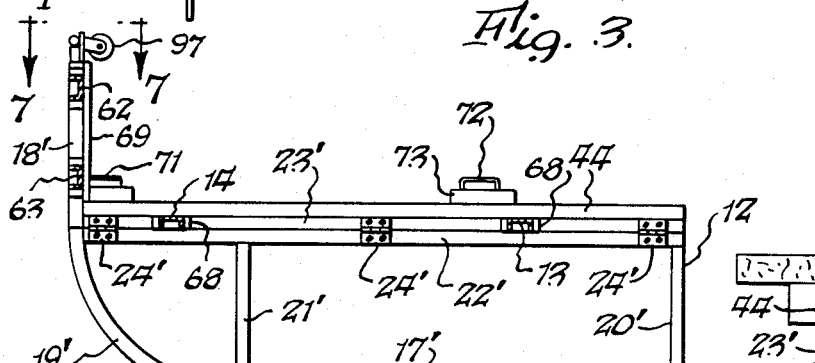
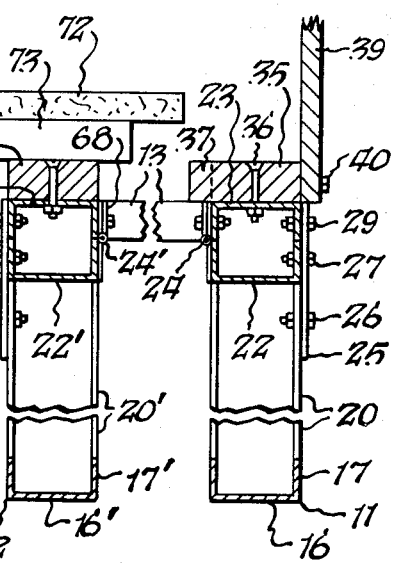
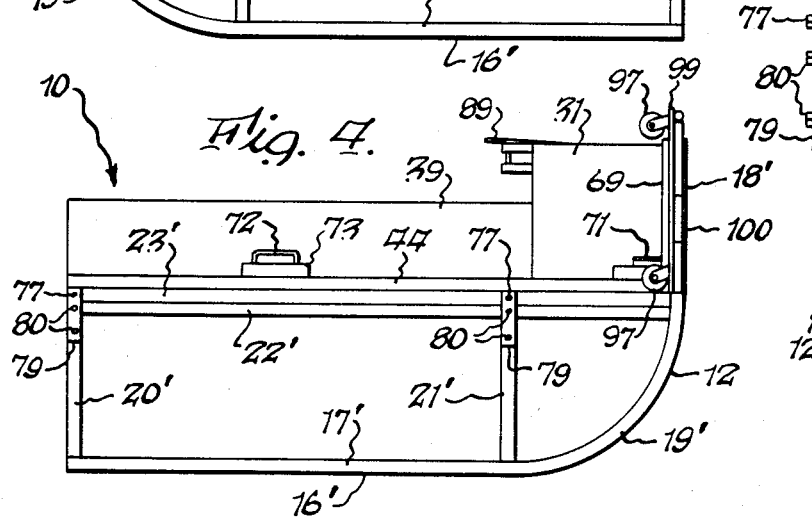

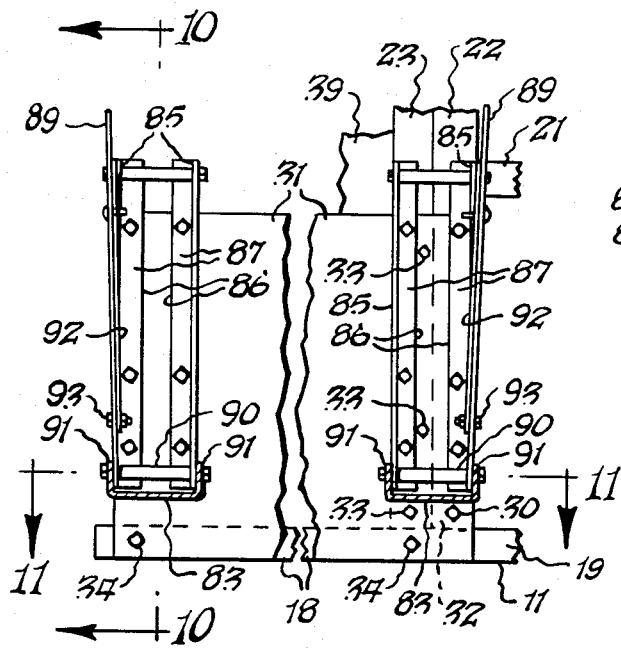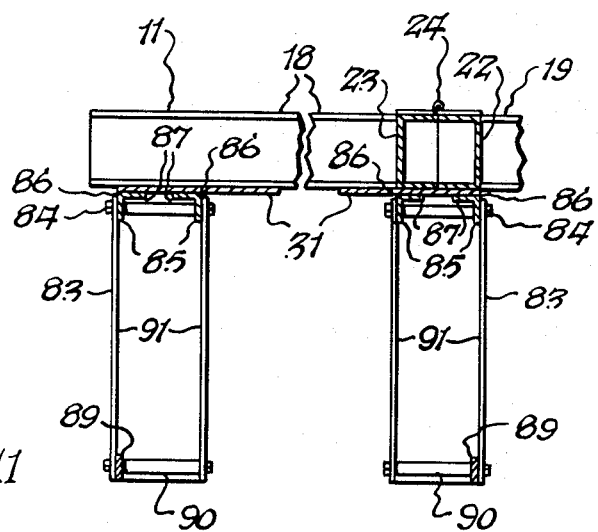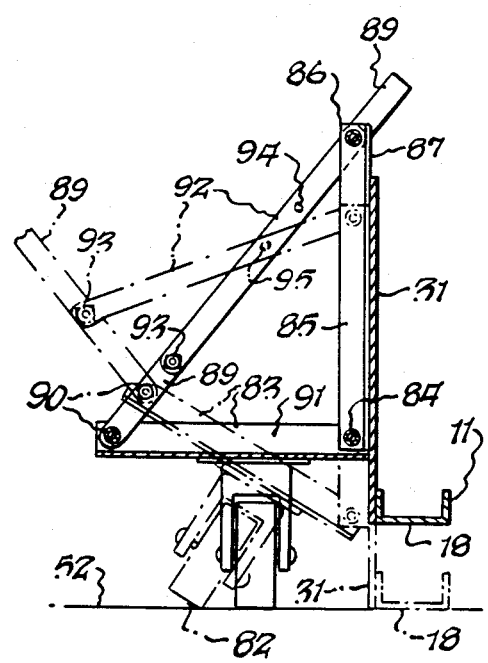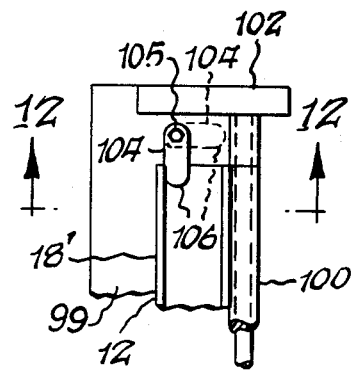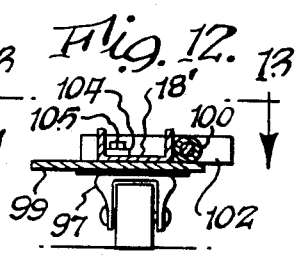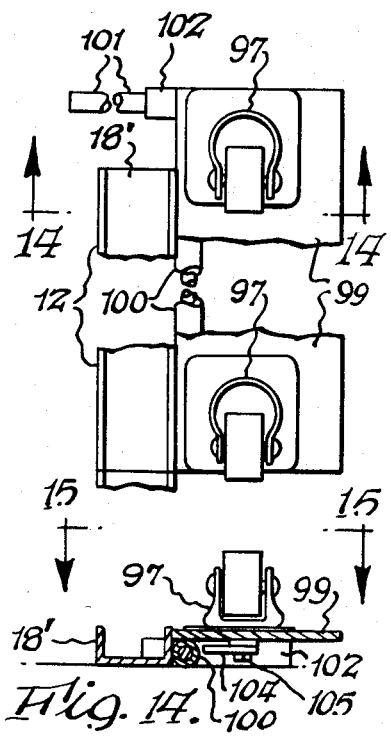

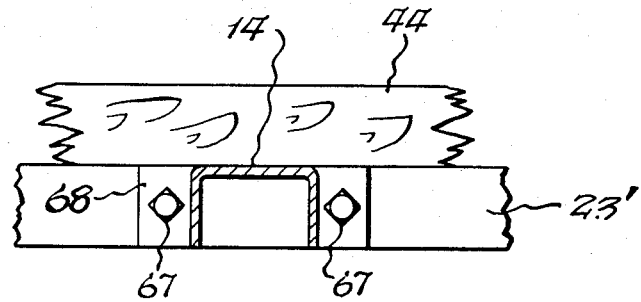
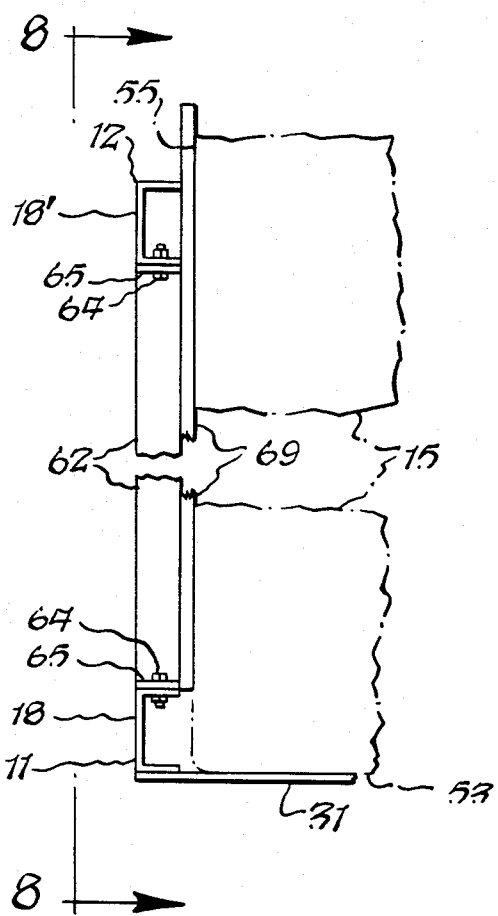
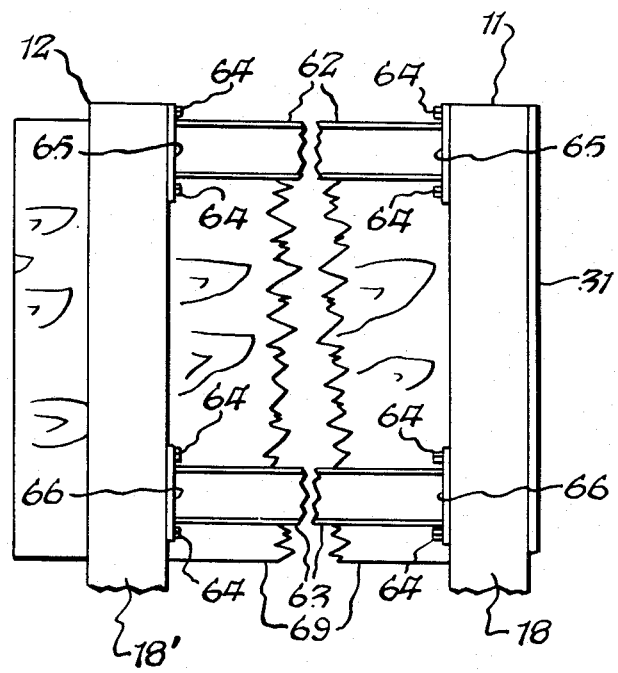

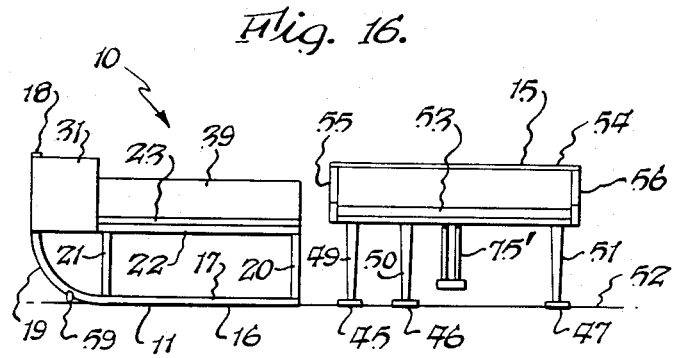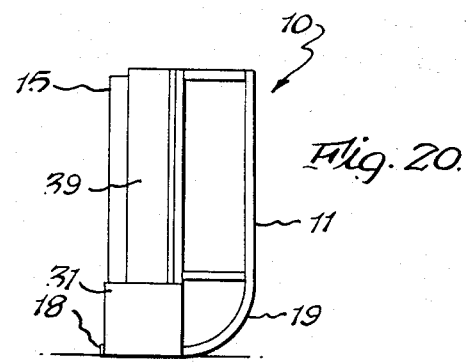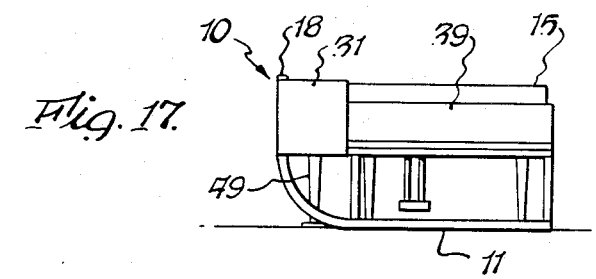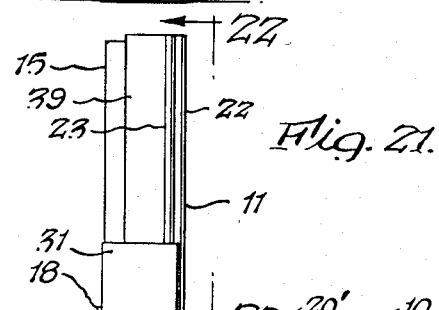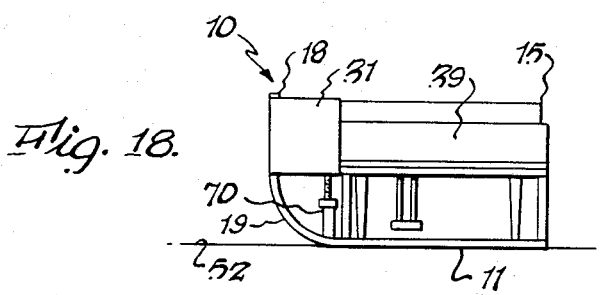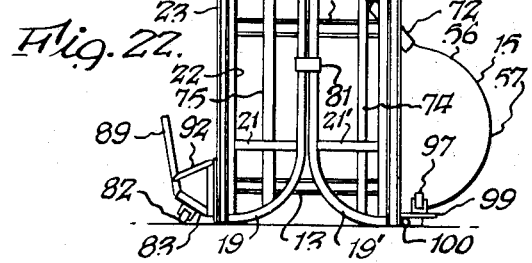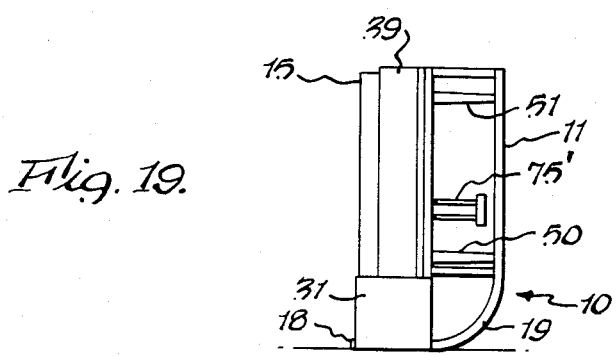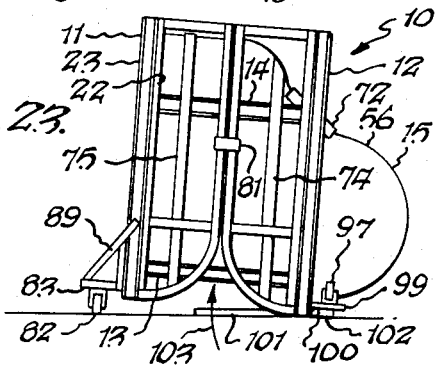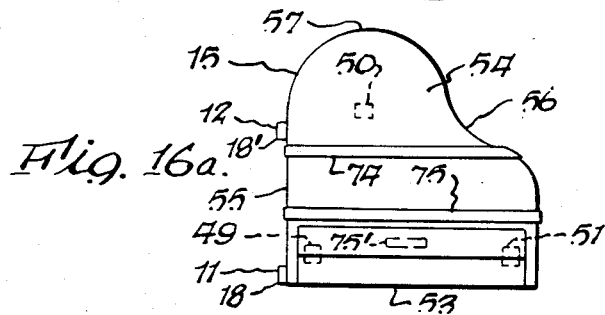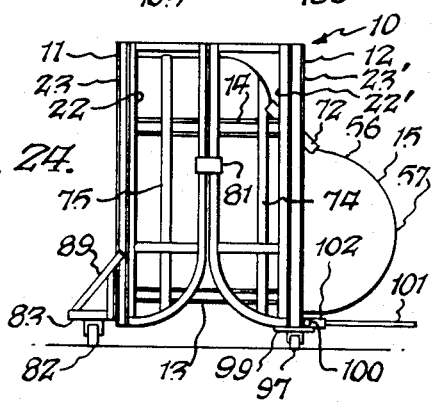

PIANO TRUCK

BACKGROUND OF THE INVENTION

The present invention relates to an improved piano truck for moving a grand piano.

By way of background, grand pianos are normally moved by a number of men who usually tilt the piano on its side and place it on a small dolly and roll the dolly about while supporting the piano on its side. This not only requires a number of men but the piano is also perched precariously and can be damaged if its slips off of the dolly. There is also a known prior piano truck shown in U.S. Pat. No. 1,285,457. However, this truck has to be lifted into mounting engagement with the side of a piano before the piano can be tilted to its side for movement to a remote location. In addition, the truck of this patent fastens only to the edge of the piano and does not support its entire underside. It is with an improved piano truck which overcomes the foregoing deficiencies that the present invention is concerned.

SUMMARY OF THE INVENTION

It is one object of the present invention to provide an improved piano truck which will permit one person to tip a grand piano onto its side and move it to a desired location.

Another object of the present invention is to provide an improved piano truck, which in disassembled condition occupies very little space.

Yet another object of the present invention is to provide an improved piano truck which can hold a piano securely in transit and which is made up in such a manner that it is relatively economical to produce. Other objects and attendant advantages of the present invention will readily be perceived hereafter.

The present invention relates to a truck for moving a grand piano comprising first and second spaced side members, first and second frame members on said first and second side members for supporting the underside of a piano, third and fourth frame members for mounting said first and second frame members, respectively, in a first attitude relative to a floor, beam means for selectively connecting said first and second frame members to each other, means on said first and second spaced side members for pivoting said first and second side members to a second attitude which is approximately ninety degrees from said first attitude, first and second caster means on said truck, and linkage means for moving said first and second caster means toward and away from said floor when said first and second side members are in said second attitude.

The various aspects of the present invention will be more fully understood when the following portions of the specification are read in conjunction with the accompanying drawings wherein:

BRIEF DESCRIPTION OF THE DRAWINGS

FIG. 1 is a side elevational view of the piano truck taken substantially in the direction of arrows 1—1 of FIG. 2;

FIG. 2a is a fragmentary cross sectional view taken substantially along line 1a-1a of FIG. 1 and showing the locking connection at this point between the hinged portions of the side frame member;

FIG. 1b is a fragmentary view taken substantially in the direction of arrow 1b-1b of FIG. 1 and showing the stabilizing bar utilized in conjunction with the side frame member;

FIG. 1c is a fragmentary cross sectional view taken substantially along line 1c-1c of FIG. 1 and showing the connection between the board on the frame member which abuts the piano keyboard and the plate which carries the casters;

FIG. 2 is a fragmentary plan view of the truck taken substantially in the direction of arrows 2—2 of FIG. 1;

FIG. 3 is a cross sectional view taken substantially along line 3—3 of FIG. 2 and showing particularly the hinged portions of the side frame member;

FIG. 4 is a side elevational view of the truck taken in the direction of arrows 4—4 of FIG. 2;

FIG. 5 is a fragmentary cross sectional view taken substantially along line 5—5 of FIG. 1 and showing particularly the details for locking the frame members in an open relationship and the structure on the frame members for supporting the underside of the keyboard and other portions of the piano case;

FIG. 6 is a fragmentary cross sectional view taken substantially along line 6—6 of FIG. 2 and oriented 90° counterclockwise from the position of FIG. 2 and showing portions of the caster mounting structure;

FIG. 7 is a fragmentary view taken substantially in the direction of the arrows 7—7 of FIG. 3;

FIG. 8 is a fragmentary view taken substantially in the direction of the arrows 8—8 of FIG. 7;

FIG. 9 is a fragmentary cross sectional view taken substantially along line 9—9 of FIG. 2 and showing the structure for fastening the beams to the side frame members;

FIG. 10 is a fragmentary cross sectional view taken substantially along line 10—10 of FIG. 6 and showing, in dotted lines, the caster mounting construction in a retracted position relative to the remainder of the frame and also showing, in solid lines, the casters in a position wherein they support the frame for rolling movement;

FIG. 11 is a fragmentary cross sectional view taken substantially along line 11—11 of FIG. 6;

FIG. 12 is a fragmentary cross sectional view taken substantially along line 12—12 of FIG. 13 and showing, in an extended condition, the caster construction for supporting the end of the piano remote from the keyboard;

FIG. 13 is a fragmentary plan view taken substantially in the direction of arrows 13—13 of FIG. 12 and showing the hinge construction for the caster supporting plate and the locking construction for the supporting plate;

FIG. 14 is a fragmentary cross sectional view taken substantially along line 14—14 of FIG. 15 and showing the caster construction of FIG. 12 in a retracted position wherein the casters do not engage the floor;

FIG. 15 is a fragmentary view taken substantially in the direction of arrows 15—15 of FIG. 14;

FIG. 16 is a schematic view showing a grand piano mounted on blocks and the side frame member shown in FIG. 1 in position to be slid under the keyboard;

FIG. 16a is a plan view of a grand piano;

FIG. 17 is a schematic view showing the side frame member of FIG. 16 slipped under the keyboard end of the grand piano;

FIG. 18 is a schematic view in which the assembled piano truck is lifted into engagement with the underside of the piano to enable removal of the blocks from under the piano legs;

FIG. 19 is a schematic view showing the piano tied to the truck and pivoted to a vertical position;

FIG. 20 is a side elevational view similar to FIG. 16 and showing the pedal structure and the remaining legs of the piano detached from the bottom of the piano;

FIG. 21 is a side elevational view similar to FIG. 20 but showing the portions of the side frame members pivoted to a retracted position;

FIG. 22 is a schematic view taken substantially in the direction of arrows 22—22 of FIG. 21 and showing the hinged portions of the side frame members in a retracted position and tied together and also showing the two sets of casters in retracted positions;

FIG. 23 is a schematic view similar to FIG. 22 but showing the left hand casters in an extended position to support the truck and the piano tied thereto; and FIG. 24 is a schematic view similar to FIG. 23 and showing the casters on the right hand side in an extended position.

DESCRIPTION OF THE PREFERRED EMBODIMENTS

As noted briefly above, one person can secure a grand piano to truck 10, tip the assembled piano and truck 90°, roll the assembly to a desired location, and thereafter tip the assembly back so that the piano is oriented in its playing position, so that the piano may be disassembled from the truck.

The improved truck 10 includes a pair of spaced side members 11 and 12 which are assembled to each other by means of beams 13 and 14 to form truck 10, after side members 11 and 12 have been oriented in carrying relationship to a grand piano 15, as explained in greater detail hereafter. Side member 11 comprises a bottom rail 16 in the form of a channel having a straight portion 17 which merges into a curved portion 19 (FIGS. 1 and 1b). The upper end of channel 19 is aligned with channel 18 and the lower end of channel 18 is welded to a channel 23. Struts 20 and 21 in the form of channels have their lower ends welded to channel 17 and their upper ends welded to a rail in the form of channel 22 (FIGS. 1 and 5). The left end of channel 22 meets the upper end of curved channel portion 19 and is welded thereto (FIG. 1a). A top rail in the form of a second channel 23 is hinged to channel 22 by hinges 24 (FIGS. 2 and 5). A strap 25 (FIGS. 1 and 5) has its lower end permanently secured to brace strut 20 and channel 22 by bolts 26 and 27. The upper end of strap 25 is releasably secured to channel 23 by means of a screw 29. When screw 29 is in place, strap 25 holds the hinged portion comprising channels 16 and 22 connected by braces 20 and 21 in the extended position shown in FIG. 1. A screw 30 (FIG. 1a) extends between steel plate 31 and leg 32 of channel 22 to cause this portion of plate 31 to perform the same function as strap 25, that is, to hold channels 22 and 23 in the assembled position shown in FIGS. 1 and 1a. Steel plate 31 is bolted to channel 23 by a plurality of bolts 33, and plate 31 is secured to the channel 18 by bolts 34 (FIGS. 1, 1a and 6). Channel 22 is not secured in any way to plate 31, thus leaving it free to swing away from plate 31 about the axis of hinges 24, as will become more apparent hereafter.

A wood bar 35 is bolted to the web of channel 23 by means of a plurality of bolts 36 (FIG. 5), and bar 35 includes an enlarged portion 37 (FIG. 2) which fits under the keyboard end of the piano. A wooden side 39 is attached to bar 35 by a plurality of screws 40 (FIGS. 1 and 5), and side 39 abuts the keyboard end of the piano when side 11 is in carrying position relative to the piano. Wood side 39 is secured to plate 31 by means of strap 41 (FIGS. 1 and 1c) by means of screws 42 which extend through strap 41 into wood side 39 and by means of bolts 43 which extends through strap 41 and steel plate 31. Plate 31 mounts a pair of casters in a manner to be described in detail hereafter.

Truck 10 also includes a side frame member 12 which is used in conjunction with side frame member 11. Side frame member 12 includes a bottom rail 16' (FIG. 3) which is the mirror image of bottom rail 16, and it also includes a curved portion 19' which is the mirror image of curved portion 19. A pair of braces 20' and 21', which are mirror images of braces 20 and 21, respectively, extend upwardly from the bottom rail 16' and are welded to the underside of channel 22' which is essentially the mirror image of channel 22. A plurality of hinges 24', which are the mirror images of hinges 24, hingedly secure channel 22' to channel 23', which is the mirror image of channel 23. A wooden bar 44 is bolted to the web of channel 23'. Additional structure of side frame member 12 will be described at appropriate points hereafter.

In order to secure piano 15 to truck 10 and tilt the assembly to a position wherein the piano is oriented so that it essentially stands on its side, the following steps are performed relative to piano 15 (FIG. 16a) which includes a keyboard end 53 and a case 54 having a straight side 55 and a curved side 56 and a remote end 57. First, blocks 45, 46 and 47 (FIG. 16) are placed under piano legs 49, 50 and 51, respectively, so as to lift the piano a few inches higher than its normal elevation on a floor 52. A padded fabric piano cover is then installed onto the piano so that it covers the top, sides and keyboard. In view of the tendency of side frame 11 to tilt sideways when it is not assembled with the remainder of the truck, a stabilizing bar 59 (FIG. 1b) is clamped to the underside of channel portion 19 (FIG. 1) by tightening clamp member 60 so that channel 19 is held between it and clamp member 61. Then side 11 is moved from the position shown in FIG. 16 to approximately the position shown in FIG. 17 with wood bar 35 underlying the keyboard end of the piano and with the board 39 in abutting relationship with the keyboard end of the piano. There will be a clearance between the underside of the keyboard 53 and the top of wood bar 35. However, this clearance will be less than the height of blocks 45, 46 and 47. The upstanding channel portion 18 is positioned approximately 6 inches from piano side 55.

After the foregoing, side frame member 12 is slipped under the piano so that it lies parallel to side frame member 11 with channel 18' located about 6 inches from the piano side 55. A stabilizing bar, such as 59, is used with side frame member 12. Thereafter, brace channels 62 and 63 (FIGS. 3, 7 and 8) are secured to channels 18 and 18' by the use of screws 64 which extend through flanges 65 and 66 at the ends of channels 62 and 63, respectively. At this stage screws 64 are not fully tightened.

The next step in the process of securing piano 15 to truck 10 is to secure channels 23 and 23' of side frame members 11 and 12, respectively, to each other by the use of identical beams 13 and 14 which will be of the same length as channels 62 and 63. From FIGS. 2 and 9 it can be seen that channel 14 has flanges 68 at its opposite ends and these flanges are secured to channels 23 and 23' by screws 67.

After beams 13 and 14 and channels 62 and 63 have been installed, screws 64 and 67 are tightened. It will be appreciated that channels 13, 14, 62 and 63 may be provided in sets of different sizes to accommodate different sizes of pianos. Thereafter, a wood plank 69 (FIG. 7) is laid beween the side 55 of the piano and channels 18, 18', 62 and 63 of the truck. The edge of plank 69 will lie on the surfaces of board bars 44 and 35 or on blocks supported thereon. Thereafter, the frame which has been assembled in the foregoing manner is pushed so that plank 69 is pressed between piano side 55 and the channels 18, 18', 62 and 63. It will be appreciated that the piano cover covers the side 55 so that it will not be marred by plank 69. Certain grand pianos do have support rails secured to the outside of the piano side 55. With pianos of this type, a plank is not required as the rails will rest directly on the webs of channels 62 and 63.

The next step in mounting piano 15 onto truck 10 is to cause the underside of the piano to be supported by side frame members 11 and 12. To this end a suitable jack 70 (FIG. 18) is placed between floor 52 and beam 14, and the frame 10 is lifted into engagement with the underside of the piano so that the underside of the keyboard portion 53 rests on wood bar 35 and side 55 rests on block 71 on side frame member 12. The curved side 56 of the piano will rest on block 72 which is pivotally mounted on block 73 secured to wood bar 44 at any desired location by the use of screws 78 (FIG. 2). The pivotal mounting of block 72 permits it to extend lengthwise of curved side 56 so as to provide a maximum bearing area.

After the truck 10 has been jacked up, block 45 is removed and leg 49 is unfastened from the underside of the piano. Thereafter, blocks 46 and 47 are removed from beneath legs 50 and 51, respectively. Jack 70 is then lowered so that the bottom rails 16 and 16' will rest on the floor while the piano underside is supported by the wood bar 35 on side 11 and on blocks 71 and 72 on side 12. At this time a wood sheet (not shown), such as plywood, preferably of the contour of the piano top 54, is laid onto the piano cover and a pair of belts 74 and 75 are caused to encircle the board on top of the piano, members 62 and 63, beams 13 and 14 and side 56, so that the belts 74 and 75 are located in the positions substantially shown in FIGS. 16a and 22. Belts 74 and 75 are tightened by the use of suitable buckles (not shown) to cause the truck 10 to be bound to piano 15. The piano is protected by the piano cover which covers its top and sides and keyboard and the board which lies on top of the cover on the piano top.

After the piano has been secured in the foregoing manner, and all of the blocks 45, 46 and 47 have been removed, and the jack 70 has been removed, the piano and the truck can be tilted by one person from the horizontal position of FIG. 18 to the vertical position of FIG. 19 because of the rolling action along curved channel portions 19 and 19'. The piano will then be resting with its side 55 on plank 69 which in turn will be supported by channels 18, 18', 62 and 63. At this point, legs 50 and 51 and the foot pedal structure 75' can be removed so that the unit consisting of the truck 10 with the piano secured thereto is shown as depicted in FIG. 20.

At this juncture, if desired, the lower portions of the side frame members 11 and 12, that is, the portions consisting of channels 22 and 22' and all parts lying below them in FIGS. 1 and 3, may be folded inwardly about hinges 24 and 24' so that they lie against the underside of the piano and assume the positions shown in FIGS. 21 and 22-24. To achieve this, screws 29 and 30 are unfastened to permit channel 22 to swing inwardly about hinges 24. In addition, screws 77 are unfastened so as to permit detachment of straps 79 from channel 23', the straps remaining secured to channel 22' and braces 20' and 21' by screws 80 (FIG. 4). After the side frame members have been folded inwardly, channels 16 and 16' may be secured to each other by means of a suitable strap 81 (FIG. 22). If it is not necessary to fold the frame to the condition shown in FIGS. 21 and 22, it may be left in the condition of FIG. 20. The folding is a convenience to conserve space to permit passage of the truck mounted piano through narrow doorways or the like. Furthermore, when the piano is transported on a motor vehicle, it is preferable to leave the frame in the condition shown in FIG. 20 as this will provide greater stability against tipping.

After the truck mounted piano has been moved to the position of FIG. 22, the casters on side frame 11 are moved from an inactive position shown in dotted to an active position shown in solid lines (FIG. 10). Casters 82 (FIGS. 1 and 10) are mounted on channels 83 (FIG. 6) which have their inner ends pivotally mounted on pins 84 which are supported by legs 85 of angles 86 having their other legs 87 bolted to plate 31, which comprises a base for casters 82. Elongated links 89 have their lower ends pivotally connected at 90 to legs 91 of channels 83. Elongated links 92 have first ends pivotally connected to links 89 at 93 and second ends pivotally connected to legs 85 of angles 86. When links 89 are in the dotted line position, such as shown in FIG. 10, links 92 will also be in the dotted line position so that channels 83 will be in the dotted line position. When links 89 are moved to the solid line position, they will move into alignment with links 92 so that channels 83 will move to the solid line position and carry casters 82 to the solid line position. This will cause plate 31 and channel 18 to move from their dotted line positions to the solid line positions. This is schematically shown in FIGS. 22 and 23. Links 89 can be secured in the solid line position of FIG. 10 by passing a bolt through aligned apertures 94 and 95 in links 89 and 92, respectively.

Another pair of casters 97 (FIG. 4) are mounted on channel 18'. More specifically, casters 97 are mounted on plate 99 (FIGS. 12-15) which is hinged to channel 18' by means of an elongated hinge 100. Normally plate 99 occupies the position of FIG. 15 wherein casters 97 face the piano (FIGS. 4 and 23) with the upper caster 97 located above piano side 55 and the lower caster 97 located below piano side 55. In order to move the casters 97 from the inactive position of FIG. 23 to the rolling position of FIG. 24, an elongated bar 101 is inserted into tube 102 welded on the opposite side of plate 99 from casters 97. Bar 101 is then pivoted in the direction of arrow 103 (FIG. 23) to cause plate 99 to pivot in a clockwise direction about hinge 100 until casters 97 assume the position of FIG. 24. Thereafter, a key 104 (FIG. 13) is pivoted about the axis of screw 105 from its dotted line position to its solid line position wherein its end 106 overlies the web of channel 18' to thereby secure plate 99 in the position shown in FIG. 24.

After the foregoing steps have been performed, the piano-mounted truck can be rolled to any desired position. The piano can then be set up in playing position by reversing the above enumerated steps utilized in mounting it onto truck 10. Briefly the steps are as follows:

Casters 97 are raised from the position of FIG. 24 to the position of FIG. 23 and thereafter casters 82 are raised from the position of FIG. 23 to that of FIG. 22. This will cause the truck to rest on channels 18, 18', 62 and 63. The side frames 11 and 12 can then be extended to the positions shown in FIG. 20 and locked into place by the use of the straps 25 and 79 and screw 30. The piano legs 50 and 51 and the foot pedal structure 75 can then be reattached. Thereafter, the truck-piano assembly can be pivoted from the position of FIG. 19 to the position of FIG. 18. Thereafter, a jack 70 is used to raise the assembled truck and piano and leg 49 is reattached. Thereafter, blocks 45, 46 and 47 are placed under legs 49, 50 and 51, respectively. The belts 74 and 75 are then removed, and the board is removed from the top of the piano. Thereafter, jack 70 is lowered so that the piano legs come to rest on their respective blocks. Continued lowering of the jack causes the truck 10 to move away from the underside of the piano. Thereafter, cross beams 13 and 14 are detached from the side frame members so that side frame members 11 and 12 may be pulled away from the piano to the position shown in FIG. 16. This can be done with channels 62 and 63 attached, or if desired, these channels can be detached and the side frame members 11 and 12 can be pulled out separately.

While not specifically shown in the drawings, brackets can be connected between the side frame members 11 and 12 (or the beams 13 and 14) and beams, not shown, which form structure of the underside of the piano, to further stablize the piano on the truck in addition to the stablization provided by the belts 74 and 75. These brackets can be in the nature of strap and heel block assemblies secured to beams 13 and 14 by means of bolts and/or in the nature of first plates slid behind a beam on the underside of the piano and secured to other plates on the opposite sides of beams 13 and 14 from the beams on the piano by elongated bolts. Alternatively, any other bracket structure can be used to secure the underside of the piano to the truck.

Correlating the foregoing described structure with the terminology of the claims, the improved truck 10 includes first and second side members 11 and 12, first and second frame members 23 and 23', a third frame member consisting of members 17, 20, 21 and 22, and a fourth frame member consisting of members 17', 20', 21' and 22'. The structure also includes first piano engaging means 35 and 39 on the first frame member and it also includes second piano engaging means 71, 72 on the second frame member. The third frame member includes the means 17, 20, 21 and 22 for supporting the first frame member 23, and the fourth frame member includes the means 17', 20', 21' and 22' for supporting the second frame member. The first and second beams are beams 13 and 14. The first and second curved portions on the third and fourth frame members are portions 19 and 19', respectively. The first and second rails of the first and ssecond frame members, respectively, are rails 23 and 23'. The third and fourth rails of the third and fourth frame members, respectively, are rails 16 and 16'. The fifth and sixth rails of the third and fourth rail members, respectively, are rails 22 and 22'.

Further correlating the described structure with the terminology of the claims, the casters 82, and their associated linkages, and the casters 97, and their associated mountings, comprise extensible-retractable caster means. The first caster means are casters 82, the base means is plate 31 and the link means for pivoting the first caster means toward and away from the base means are links 91, 92 and 89. Channel 18 constitutes a seventh frame member. The second caster means are casters 97. The eighth frame member constitutes channel 18'. The second palte is member 99. The first hinge means are hinges 24 and the second hinge means are hinges 24'. The first locking means are straps 25 and 41, and the second locking means are straps 79.

It can thus be seen that the piano truck of the present invention is manifestly capable of achieving the above enumerated objects, and while preferred embodiments have been disclosed, it will be appreciated that the present invention is not limited thereto but may be otherwise embodied within the scope of the following claims.

What is claimed is:

1. A truck for moving a grand piano having a piano body with a straight side extending substantially perpendicularly to a keyboard and having an underside and a pair of legs located generally under said keyboard and a third leg remote from said pair of legs comprising first and second separate and unconnected spaced side members prior to attachment to said piano, first and second frame members included in said first and second side members, respectively, for placement in unconnected relationship with each other on opposite sides of said pair of legs and in contiguous underlying relationship to said underside of said piano body and substantially parallel to said keyboard and extending substantially perpendicularly to said straight side, said first and second frame members comprising first and second elongated rails, first and second piano engaging means on said first and second elongated rails, respectively, for engaging said underside of said piano body, said first piano engaging means engaging said underside of said piano body substantially underneath said piano keyboard, said second piano engaging means being located on the opposite side of said pair of legs from said first piano engaging means, third and fourth frame members included in said first and second side members, respectively means connecting said third and fourth frame members to said first and second frame members, respectively, said third and fourth frame members including means for supporting said first and second frame members and a piano body supported by said piano engaging means in a horizontal attitude relative to a floor, first and second beams located between said first and second elongated rails and positioned between said pair of legs, said first and second beams being essentially coplanar with and spaced along said first and second elongated rails, connecting means for selectively connecting said first and second frame members to opposite ends of said first and second beams after said first and second frame members have been positioned underneath said piano body and after said beams have been positioned between said pair of legs and before any of said legs have been disconnected from said piano body, said third and fourth frame members including third and fourth elongated rails underlying said first and second rails, respectively, and oriented substantially parallel thereto, first and second curved portions at the ends of said third and fourth rails, respectively, underlying said first and second rails, respectively, whereby said truck can be rolled from a position wherein said third and fourth rails support said first and second rails and said piano body in said horizontal attitude to a position wherein said first and second rails and said piano body supported thereby extend substantially perpendicularly to said floor, and extensible-retractable caster means on said truck operable when said first and second frame members extend substantially perpendicularly to said floor for moving said first, second, third and fourth frame members away from said floor when said casters are extended and toward said floor when said casters are retracted.

2. A truck for moving a grand piano as set forth in claim 1 wherein said third and fourth frame members include fifth and sixth elongated straight rails, respectively, located in contiguous substantially parallel relationship to said first and second rails, respectively.

3. A truck for moving a grand piano as set forth in claim 2 including hinge means between said first and fifth rails and between said second and sixth rails.

4. A truck for moving a grand piano as set forth in claim 2 wherein said first and second curved portions comprise extensions of said third and fourth rails which terminate at said fifth and sixth rails, respectively.

5. A truck for moving a grand piano as set forth in claim 4 including hinge means between said first and fifth rails and between said second and sixth rails.

6. A truck for moving a grand piano as set forth in claim 1 wherein said extensible-retractable caster means include first caster means, base means for mounting said first caster means on said first frame member, and link means for pivoting said first caster means toward and away from said base means.

7. A truck for moving a grand piano as set forth in claim 6 wherein said base means comprises a plate, a first edge on said plate secured to said first frame member, a seventh frame member extending perpendicularly to and secured to said first frame member, and a second edge on said plate secured to said seventh frame member.

8. A truck for moving a grand piano as set forth in claim 7 wherein said extensible-retractable caster means include second caster means, an eighth frame member extending perpendicularly to and secured to said second frame member, a second plate, means mounting said second caster means on said second plate, means pivotally mounting said second plate on said eighth frame member, and means for locking said plate to said eighth frame member when said second caster means are in an extended position.

9. A truck for moving a grand piano having an underside comprising first and second spaced side members, first and second frame members included in said first and second side members for supporting said underside of said piano, said first and second frame members being separated and unconnected relative to each other prior to their attachment to said piano, third and fourth frame members included in said first and second side members, respectively, for supporting said first and second frame members, respectively, in a first attitude substantially parallel to a floor prior to attachment of said first and second frame members to said piano, beam means for selectively connecting said first and second frame members to each other after they have been positioned under said piano, said beam means being essentially coplanar with and spaced along said first and second frame members, means on said first and second spaced side members for pivoting said first and second side members to a second attitude which is substantially perpendicular to said floor, first and second caster means on said truck, and linkage means for moving said first and second caster means toward and away from said floor when said first and second side members are in said second attitude.

10. A truck for moving a grand piano as set forth in claim 9 including first hinge means between said first and third frame members, second hinge means between said second and fourth frame members, first locking means for selectively locking said third frame member against hinged movement relative to said first frame member, and second locking means for locking said fourth frame member against hinged movement relative to said second frame member.

11. A truck for moving a grand piano as set forth in claim 9 wherein said first caster means are mounted on said first side member and said second caster means are mounted on said second side member.

12. A truck as set forth in claim 1 wherein said first rail extends substantially across the entire width of said piano body, and wherein said first piano body engaging means engages said underside of said piano body substantially across the entire length of said keyboard.

13. A truck as set forth in claim 1 wherein said second rail extends substantially across the entire width of said piano body, and wherein said second piano engaging means engage said underside of said piano body at spaced locations on opposite sides of the width of said piano body.

14. A truck as set forth in claim 13 wherein said second piano engaging means comprise a pair of spaced blocks mounted on said second elongated rail.

15. A truck as set forth in claim 13 wherein said first rail extends substantially across the entire width of said piano body, and wherein said first piano body engaging means engages said underside of said piano body substantially across the entire length of said keyboard.

16. A truck as set forth in claim 15 wherein said third and fourth rails are of substantially the same lengths as said first and second rails, respectively.

17. A truck as set forth in claim 16 wherein said third and fourth frame members include fifth and sixth rails, respectively, located in contiguous substantially parallel relationship to said first and second rails, respectively, wherein said first and second curved portions terminate at said fifth and sixth rails, respectively.

18. A truck as set forth in claim 8 wherein said second caster means comprise a pair of casters spaced apart a distance which is greater than the depth of said piano body, and wherein said second plate underlies said piano body and said pair of casters are on opposite sides of said piano body when said first and second rails and said piano body extend substantially perpendicularly to said floor and when said pair of caster are in an extended position.

* * * * *